US010924661B2

(12) United States Patent
Vasconcelos et al.

(10) Patent No.: US 10,924,661 B2
(45) Date of Patent: Feb. 16, 2021

(54) GENERATING IMAGE CAPTURE CONFIGURATIONS AND COMPOSITIONS

(71) Applicant: International Business Machines Corporation, Armonk, NY (US)

(72) Inventors: Marisa Affonso Vasconcelos, São Paulo (BR); Carlos Henrique Cardonha, São Paulo (BR); Miguel Paredes Quinones, São Paulo (BR); Andrea Britto Mattos Lima, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/401,135

(22) Filed: May 2, 2019

(65) Prior Publication Data

US 2020/0351437 A1    Nov. 5, 2020

(51) Int. Cl.
*H04N 5/232* (2006.01)
*H04N 9/64* (2006.01)
(Continued)

(52) U.S. Cl.
CPC ......... *H04N 5/23222* (2013.01); *G06N 20/00* (2019.01); *G06Q 50/01* (2013.01); *H04N 5/23216* (2013.01); *H04N 5/2621* (2013.01)

(58) Field of Classification Search
CPC ........... H04N 5/23222; H04N 5/23216; H04N 5/23293; H04N 5/2621; H04N 1/0062; H04N 1/00183; H04N 5/232933; H04N 5/23218; H04N 9/646; H04N 1/6086; G06N 20/00; G06Q 50/01; G06F 16/5838; G06F 16/9038; G06F 16/29; G06F 16/483;
(Continued)

(56) References Cited

U.S. PATENT DOCUMENTS 5,635,725 A    6/1997 Cooper
5,774,747 A    6/1998 Ishihara et al.
(Continued)

FOREIGN PATENT DOCUMENTS

WO    2017069670 A1    4/2017

OTHER PUBLICATIONS

Dai et al, "BoxSup: Exploiting Bounding Boxes to Supervise Convolutional Networks for Semantic Segmenation," IEEE Xplore, 9 pages.

*Primary Examiner* — Marly S Camargo
(74) *Attorney, Agent, or Firm* — Patterson + Sheridan, LLP

(57) ABSTRACT

Techniques for image analysis and configuration modification are provided. A first context of a camera device is determined, where the first context includes a current location of the camera device. A plurality of prior images is identified based on the first context, where each of the plurality of prior images was captured within a predefined distance from the current location of the camera device. Further, a respective popularity score is generated for each of the plurality of prior images, based on one or more social media networks. Finally, a first set of configuration parameters is generated for the camera device, based at least in part on (i) a degree of difference between the first context and a second context associated with a first prior image of the plurality of prior images, and (ii) a first popularity score of the first prior image.

20 Claims, 6 Drawing Sheets

(51) Int. Cl.

| | | |
|---|---|---|
| *H04N 1/00* | (2006.01) | |
| *H04N 1/60* | (2006.01) | |
| *G06N 20/00* | (2019.01) | |
| *G06Q 50/00* | (2012.01) | |
| *G06F 16/583* | (2019.01) | |
| *G06F 16/903* | (2019.01) | |
| *G06F 16/29* | (2019.01) | |
| *G06F 16/483* | (2019.01) | |
| *G06F 16/587* | (2019.01) | |
| *G06F 16/14* | (2019.01) | |
| *G06F 16/532* | (2019.01) | |
| *H04N 5/262* | (2006.01) | |

(58) Field of Classification Search
CPC ...... G06F 16/14; G06F 16/144; G06F 16/148; G06F 16/152; G06F 16/156; G06F 16/532; G06F 16/487; G06F 16/58–587
USPC .......... 725/105, 109, 118; 348/222.1, 207.1, 348/207.11, 211.2, 211.3, 239, 393.1, 348/554, 702; 382/219, 218, 220, 118, 382/284, 224; 345/633, 2.2, 98, 164, 345/171, 173; 707/781, 749
See application file for complete search history.

(56) References Cited

U.S. PATENT DOCUMENTS

| | | |
|---|---|---|
| 6,067,112 A | 5/2000 | Wellner et al. |
| 6,301,440 B1 | 10/2001 | Bolle et al. |
| 6,606,117 B1 | 8/2003 | Windle |
| 6,608,650 B1 | 8/2003 | Torres et al. |
| 6,636,260 B2 | 10/2003 | Kiyokawa |
| 6,930,718 B2 | 8/2005 | Parulski et al. |
| 6,970,199 B2 | 11/2005 | Venturino et al. |
| 6,989,859 B2 | 1/2006 | Parulski |
| 8,442,265 B1 | 5/2013 | Bosworth et al. |
| 8,508,622 B1 | 8/2013 | Anon |
| 9,015,285 B1 | 4/2015 | Ebsen et al. |
| 9,667,860 B2 | 5/2017 | Hakim et al. |
| 9,686,338 B1 | 6/2017 | Farrell et al. |
| 9,843,720 B1 | 12/2017 | Ebsen et al. |
| 10,007,928 B2 * | 6/2018 | Graham ............. G06Q 30/0256 707/2 |
| 10,203,762 B2 * | 2/2019 | Bradski ................... G06F 3/017 382/103 |
| 10,623,666 B2 * | 4/2020 | Charlton ................ H04N 5/272 348/239 |
| 2002/0171746 A1 | 11/2002 | Stephany et al. |
| 2004/0190789 A1 | 9/2004 | Liu et al. |
| 2004/0263639 A1 | 12/2004 | Sadovsky et al. |
| 2006/0034602 A1 | 2/2006 | Fukui |
| 2009/0031441 A1 | 1/2009 | Matsuoka et al. |
| 2010/0045816 A1 | 2/2010 | Rhoads |
| 2010/0074613 A1 * | 3/2010 | Masune ................. G03B 41/00 396/661 |
| 2011/0029635 A1 | 2/2011 | Shkurko et al. |
| 2011/0050909 A1 * | 3/2011 | Ellenby ................... H04N 5/225 348/207.1 |
| 2011/0314049 A1 * | 12/2011 | Poirier .................... G06F 17/30 707/769 |
| 2013/0050507 A1 | 2/2013 | Syed et al. |
| 2013/0150117 A1 * | 6/2013 | Rodriguez ................ G06T 7/00 455/550.1 |
| 2014/0089401 A1 | 3/2014 | Filev et al. |
| 2014/0214547 A1 * | 7/2014 | Signorelli .......... G06Q 30/0267 705/14.64 |
| 2014/0232904 A1 * | 8/2014 | Na ......................... H04N 5/232 348/207.99 |
| 2016/0191434 A1 * | 6/2016 | Rice ........................ G06K 9/00 709/204 |
| 2016/0301860 A1 | 10/2016 | Bostick et al. |
| 2018/0041696 A1 * | 2/2018 | Balasubramanian ....................... H04N 5/23222 348/231.2 |
| 2018/0316853 A1 | 11/2018 | Liang et al. |
| 2019/0227988 A1 * | 7/2019 | Kwon ................ H04N 5/23222 348/231.2 |
| 2019/0364492 A1 * | 11/2019 | Azizi .................... H04W 48/16 370/329 |
| 2020/0128173 A1 * | 4/2020 | Lee .................... H04N 5/23216 348/231.6 |
| 2020/0160980 A1 * | 5/2020 | Lyman ......................... 382/128 |
| 2020/0285248 A1 * | 9/2020 | Kim ......................... G05D 1/02 700/255 |

* cited by examiner

GENERATING IMAGE CAPTURE CONFIGURATIONS AND COMPOSITIONS

BACKGROUND

The present disclosure relates to image capturing, and more specifically, to generating suggested configurations and compositions to improve image capturing.

A wide variety of image capturing devices are available today, including digital single-lens reflex (DSLR) cameras, film cameras, smartphone cameras, and the like. Additionally, these devices have grown increasingly complex and capable, leading to improved photographs in many cases. Often, users can manually adjust various settings to improve the captured image. However, this manual adjustment requires significant expertise, and is error-prone. Some recent imaging devices have somewhat limited capacity to automatically suggest settings in an attempt to improve the photograph. However, these suggestions are similarly error-prone, and often involve trial and error. Further, these suggestions fail to account for personal taste or preference. Similarly, existing systems cannot generate suggestions to appeal to the current zeitgeist.

SUMMARY

According to one embodiment of the present disclosure, a method is provided. The method includes determining a first context of a camera device, wherein the first context comprises a current location of the camera device. The method further includes identifying a plurality of prior images based on the first context, wherein each of the plurality of prior images was captured within a predefined distance from the current location of the camera device. Additionally, the method includes generating, based on one or more social media networks, a respective popularity score for each of the plurality of prior images. Finally, the method includes generating a first set of configuration parameters for the camera device, based at least in part on (i) a degree of difference between the first context and a second context associated with a first prior image of the plurality of prior images; and (ii) a first popularity score of the first prior image.

According to a second embodiment of the present disclosure, a computer-readable storage medium is provided. The computer-readable storage medium has computer-readable program code embodied therewith, the computer-readable program code executable by one or more computer processors to perform an operation. The operation includes determining a first context of a camera device, wherein the first context comprises a current location of the camera device. The operation further includes identifying a plurality of prior images based on the first context, wherein each of the plurality of prior images was captured within a predefined distance from the current location of the camera device. Additionally, the operation includes generating, based on one or more social media networks, a respective popularity score for each of the plurality of prior images. Finally, the operation includes generating a first set of configuration parameters for the camera device, based at least in part on (i) a degree of difference between the first context and a second context associated with a first prior image of the plurality of prior images; and (ii) a first popularity score of the first prior image.

According to a third embodiment of the present disclosure, a system is provided. The system includes one or more computer processors, and a memory containing a program. The program, when executed by the one or more computer processors, performs an operation. The operation includes determining a first context of a camera device, wherein the first context comprises a current location of the camera device. The operation further includes identifying a plurality of prior images based on the first context, wherein each of the plurality of prior images was captured within a predefined distance from the current location of the camera device. Additionally, the operation includes generating, based on one or more social media networks, a respective popularity score for each of the plurality of prior images. Finally, the operation includes generating a first set of configuration parameters for the camera device, based at least in part on (i) a degree of difference between the first context and a second context associated with a first prior image of the plurality of prior images; and (ii) a first popularity score of the first prior image.

DETAILED DESCRIPTION

Figure 1:
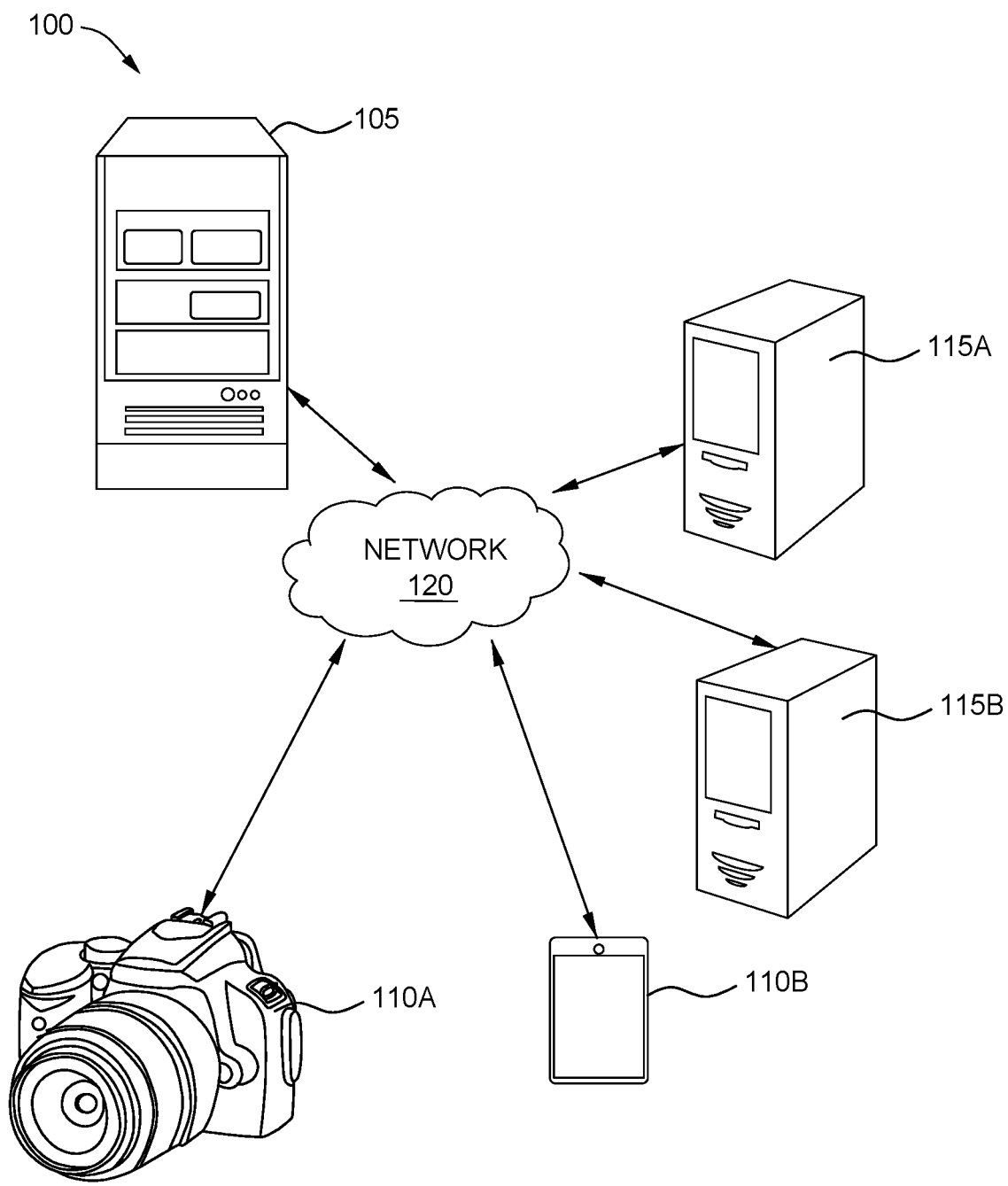
FIG. 1 illustrates an environment for generating suggested configurations and compositions for image capture devices, according to one embodiment disclosed herein.

Embodiments of the present disclosure provide automatic and real-time adjustments of settings and configurations of imaging devices (such as cameras) based on a context of the device. For example, in one embodiment, the system determines the current location of the camera device, and generates a configuration that is suited for the particular location. In various embodiments, the system can consider other aspects of the current context, such as the time of day, the lighting conditions, the current weather, and the like. Further, in some embodiments, the context includes the identity and/or preferences of the user of the camera device and/or the intended audience for the image being captured. In embodiments, the system identifies previously-captured images with a similar context to the current context, and analyzes these images to determine the quality of each.

In one embodiment, identifying similar prior images includes computing the Euclidean distance between the current context and the historical context of the prior image, as discussed in more detail below. In some embodiments, determining the quality of each prior image includes computing a popularity score for the image, based on a variety of factors. In one embodiment, the popularity score is based on how users have responded to the image (e.g., on social media). For example, in one embodiment, the popularity score is based on the number of likes, shares, favorites, and the like associated with each image. In some embodiments, the system performs sentiment analysis on comments associated with the image, in order to generate the popularity score. In one embodiment, the popularity score is generated based on crowd-sourced techniques, such as allowing a large number of users to vote on whether they like or dislike each image.

In an embodiment, the system further determines the configuration used when capturing each such image. For example, in one embodiment, the system determines the aperture setting, the ISO, the shutter speed, the white balance, the flash setting, and the like. In some embodiments, the system uses these images (and the determined popularity and context of each) to train one or more machine learning models to generate improved configurations for capturing future images, when given a current context as input. That is, in an embodiment, machine learning models are trained to receive a current context and generate a set of configurations, such that subsequently captured images are more likely to be popular or well-received by a wider audience. In other embodiments, the system utilizes rules-based algorithms to generate a suggested configuration based on the configurations of popular images with similar contexts.

In some embodiments, the system can further perform semantic segmentation on the prior images, to identify one or more elements in each. For example, in one embodiment, the system uses a deep neural network (e.g., a VGG neural network, ResNet, Convolutional neural network, and the like) to identify elements in each image such as people, scenery, vegetation, vehicles, and the like. In embodiments, this segmentation can allow the system to learn compositions (e.g., arrangements of elements in the frame of the image) that are associated with more popular images. In an embodiment, given a current context, the system can generate a suggested composition for the user, in order to improve the quality of the image. For example, in one embodiment, the system can suggest that the user have the subjects of the image stand off-center (such as to avoid obstructing scenery). In a similar embodiment, the system can suggest or instruct the user to angle the camera such that the people and/or scenery are aligned differently in the frame. In some embodiments, the system suggests the user to capture the image from a different location or angle, as discussed in more detail below.

FIG. 1 illustrates an Environment 100 for generating suggested configurations and compositions for image capture devices, according to one embodiment disclosed herein. In the illustrated embodiment, a Configuration Device 105, Camera Devices 110A-B, and Image Sources 115A-B are communicatively coupled to a Network 120 (e.g., the Internet). In an embodiment, the Camera Devices 110A-B can include any network-enabled device capable of capturing images, including a DSLR camera, a point-and-shoot camera, a camera using traditional film, a smartphone, a tablet, and the like. In one embodiment, the Camera Devices 110A communicate with the Configuration Device 105 via the Network 120. In some embodiments, if the Camera Device 110 lacks connectivity to the wider Network 120, the Camera Device 110 can interact with the Configuration Device 105 through one or more intermediate devices. For example, in one embodiment, a Camera Device 110 may have short-range communication functionality (e.g., via wired connection, or via a short-range radio such as Bluetooth or WiFi). In such an embodiment, the Camera Device 110 may connect to another device associated with the user (such as a smartphone, laptop, or tablet), and the other device can forward data to and from the Configuration Device 105 via the Network 120.

In the illustrated embodiment, the Camera Devices 110 transmit their current context to the Configuration Device 105. Although illustrated as separate devices, in some embodiments, the operations of the Configuration Device 105 are performed locally by each Camera Device 110. In one embodiment, the context is gathered and provided to the Configuration Device 105 periodically (e.g., every hour, when the device powers up, and the like). In another embodiment, the context is transmitted each time it changes (e.g., when the device moves to a new area, when the weather changes, and the like). In various embodiments, the context can include, for example, the current time, the current geographic location of the Camera Device 110, the orientation of the device (e.g., as determined using a compass or magnetometer), the current weather and/or lighting conditions at the location, and the like. In some embodiments, the context can also include the identity of the user and/or the identity of the expected or planned audience for images yet-to-be captured. In one embodiment, the context indicates the preferences of the user and/or audience.

In an embodiment, based on this context, the Configuration Device 105 generates a set of parameters, settings, or configurations for the Camera Device 110. In the illustrated embodiment, to generate these configurations, the Configuration Device 105 gathers image data from the Image Sources 115A-B. Although two Image Sources 115A-B are depicted, in embodiments, the Configuration Device 105 may utilize any number of sources for the images. Further, in some embodiments, some or all of the images may be stored locally by the Configuration Device 105. In embodiments, the Image Sources 115 can include any source for previously-captured images. For example, in one embodiment, one or more Image Sources 115 correspond to social media services where users can post images for others to like, share, comment on, and the like.

In one embodiment, the Configuration Device 105 collects these images, as well as context and configurations associated with image. For example, in one embodiment, this contextual data and/or configuration data is stored in metadata associated with each image. In some embodiments, when generating suggestions for a particular Camera Device 110, the Configuration Device 105 identifies the user of the device, and only analyzes images associated with that user. For example, in one embodiment, users register or otherwise give permission to the Configuration Device 105 to use images from the user's social media account(s). In an embodiment, the Configuration Device 105 may further utilize images posted by other users who are linked or associated to the user using the Camera Device 110. In some embodiments, the Configuration Device 105 identifies images where other users with similar preferences to the index user either posted the image or interacted with the image. Thus, in some embodiments, the Configuration Device 105 ensures that the popularity scores are generated based on data that takes the preferences of the user and/or audience into consideration.

In one embodiment, when the Configuration Device 105 receives a context from a Camera Device 110, the Configuration Device 105 uses a machine learning model to process the context and generate one or more configuration and/or composition suggestions. In some embodiments, the Configuration Device 105 uses a rules-based approach. In one embodiment, the Configuration Device 105 first identifies prior-analyzed images with a similar context. In an embodiment, contexts are considered "similar" if the Euclidean distance between the contexts is less than a predefined threshold. For example, in an embodiment, features included in the contexts are converted to numerical values, in order to generate a multi-dimensional vector for each context. In such an embodiment, the similarity between the image contexts can be defined as the distance between their associated vectors.

In one embodiment, the Configuration Device 105 determines a popularity score for each image (or for each similar image), and, when generating optimized configurations, only utilizes images with a popularity score exceeding a predefined threshold. In some embodiments, the Configuration Device 105 weights the contribution of each image based on its popularity score (and/or based on its similarity score). In such an embodiment, the popularity score and similarity score are both positively correlated to the weight of the image. For example, the images with a very similar context will be given more weight than images with relatively less similar contexts. Further, in such an embodiment, the images with higher popularity scores will be given relatively higher weight than images with relatively lower popularity scores. In this way, the generated configuration and/or composition is based largely on the configuration and/or composition of the most similar and most popular images.

In some embodiments, the Configuration Device 105 generates popularity scores based on how users have interacted with each image. For example, in one embodiment, if the Image Source 115 is a social media service, the Configuration Device 105 can determine how many users have liked the image, shared it, commented on it, and the like. In an embodiment, the number of likes, shares, favorites, and the like is positively correlated with the generated popularity score. In some embodiments, the Configuration Device 105 also utilizes natural language processing (NLP) to perform sentiment analysis on comments associated with each image. In this way, the Configuration Device 105 can determine whether the users like or dislike the image based on their comments, and adjust the popularity score accordingly.

In one embodiment, in addition to generating a configuration for the Camera Device 110, the Configuration Device 105 similarly generates a suggested composition. In an embodiment, the Configuration Device 105 determines how the elements in each of the prior images with similar contexts are arranged, and generates a suggested arrangement based on these historical compositions. For example, the Configuration Device 105 may determine that images taken with a similar context tend to be more popular if the "people" elements are off center, with a "scenery" or "building" element centered. In such an embodiment, the Configuration Device 105 can therefore suggest to the user that the Camera Device 110 should be angled (or that the user and/or the people should move) such that the people are off-center, with scenery centered in the background.

In some embodiments, the Configuration Device 105 can similarly generate a suggested composition that requires the user to physically move. For example, in one embodiment, the Configuration Device 105 may determine that the user is facing directly towards the sun, based on the Camera Device 110 context. In an embodiment, the Configuration Device 105 may suggest, for example, that the user move to the other side of the target (e.g., to the other side of the Eiffel Tower) in order to ensure the subject is fully illuminated and not washed out by excessive backlighting.

In one embodiment, the suggested compositions are provided to the user in the form of an augmented reality display. In some embodiments, the Camera Device 110 includes a screen or display (e.g., to see a preview of the image being captured). In such an embodiment, the Configuration Device 105 may instruct the Camera Device 110 to overlay one or more indications on the display, in order to indicate the suggested composition to the user. For example, if the suggested composition involves moving people to a different part of the frame, the augmented display can outline or highlight the people, and/or highlight or outline the area of the frame where the people should move. Similarly, in some embodiments, the augmented display can suggest the user angle the Camera Device 110 differently, such as by placing arrows near the edges or corners of the display, indicating which direction the user should aim the camera.

Figure 2:
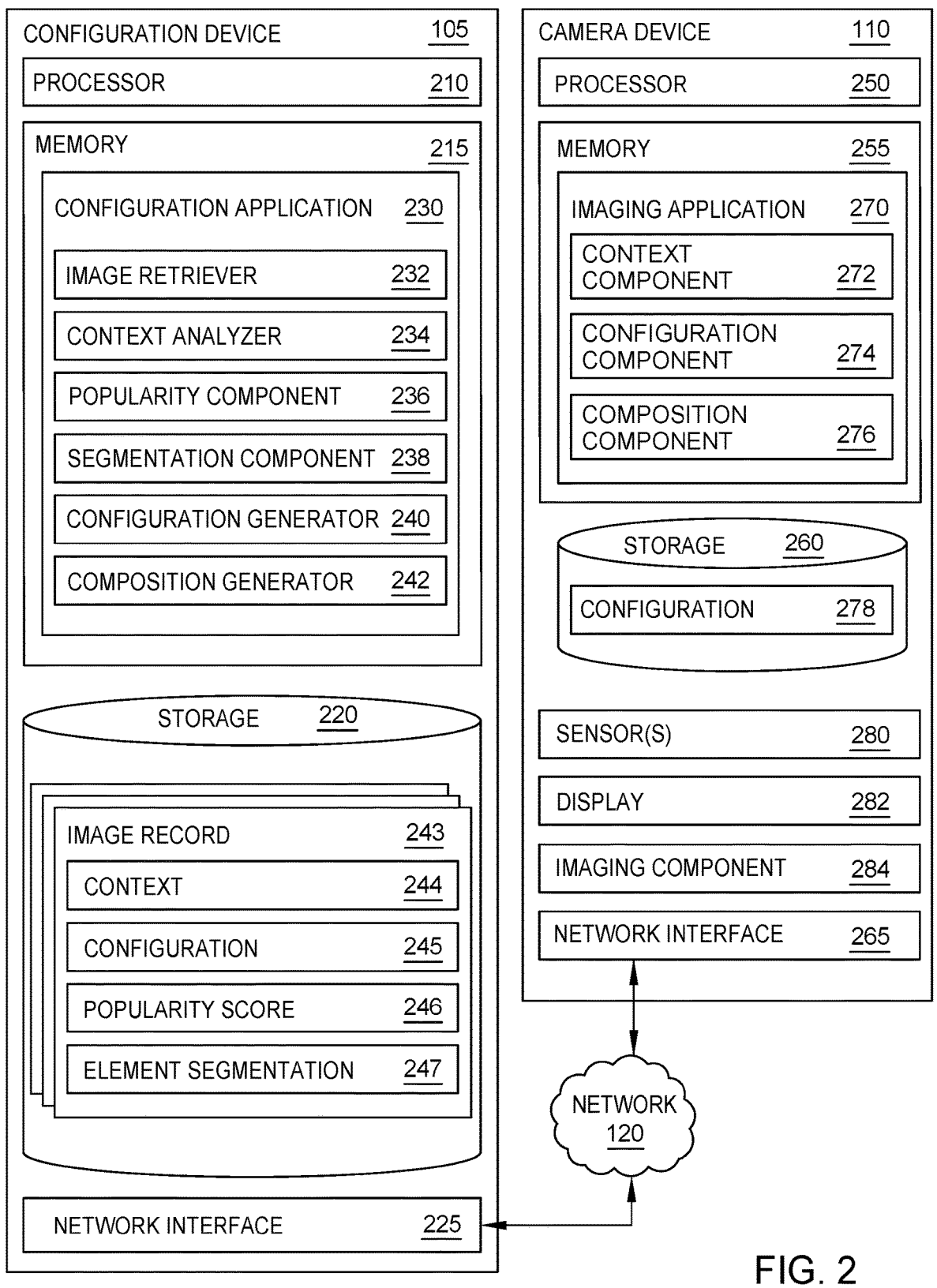
FIG. 2 is a block diagram illustrating a configuration device and a camera device configured to generate improved configurations and compositions for image capturing, according to one embodiment disclosed herein.

FIG. 2 is a block diagram illustrating a Configuration Device 105 and a Camera Device 110 configured to generate improved configurations and compositions for image capturing, according to one embodiment disclosed herein. Although illustrated as discrete devices, in one embodiment, the operations and functionality of the Configuration Device 105 are implemented locally on the Camera device 110. As illustrated, the Configuration Device 105 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area network (SAN). Via the Network Interface 225, the Configuration Device 105 can be communicatively coupled with one or more other devices including user devices, Camera Devices 110, Image Sources 115, devices or services providing machine learning models or image analysis, and the like. In one embodiment, the Configuration Device 105 operates as part of a cloud service.

In the illustrated embodiment, the Storage 220 of the Configuration Device 105 includes a number of Image Records 243. In an embodiment, each Image Record 243 includes data about a respective image ingested from an Image Source 115. In some embodiments, the Image Record 243 includes the image itself. In other embodiments, the Image Record 243 does not include the image. This can reduce storage and processing requirements. In one embodiment, the Image Record 243 includes a link to the original image in the Image Source 115. In some embodiments, the Configuration Device 105 can periodically re-compute the Popularity Score 246, using updated data from the Image Source 115.

As illustrated, each Image Record 243 includes a corresponding Context 244, which includes contextual data about the image, such as the geophysical location where it was captured, the compass direction the camera was facing, the time of day, and the like. In some embodiments, the Context 244 further identifies the user who captured the image, and/or preferences of the user. In one embodiment, the user specifies these preferences (e.g., in a user profile). In another embodiment, the preferences can be inferred (e.g., by identifying which images the user has liked and/or shared). In some embodiments, the Context 244 also identifies the target audience (e.g., the friends or associates of the user who posted the image), and/or the preferences of the target audience.

In the illustrated embodiment, each Image Record 243 also includes data about the Configuration 245 that was used by the Camera Device 110 to capture the image. In embodiments, this Configuration 245 may include, for example, aperture settings, ISO settings, shutter speed settings, white balance settings, flash settings (e.g., whether flash was enabled or not), HDR settings, filters applied, and the like. As illustrated, the Image Record 243 further includes a Popularity Score 246 that has been generated for the image, indicating the quality of the image and/or how well-received it has been. Additionally, the Image Record 243 includes an Element Segmentation 247, which indicates the location of one or more elements in the image (e.g., people, scenery, vehicles, and the like). In some embodiments, Image Records 243 older than a predefined period are purged, to ensure the generated configurations are up-to-date with the current trends and preferences. In another embodiment, the older records are maintained, but the age of the image is inversely associated with the weight given to the image, in order to account for their age.

As illustrated, the Memory 215 of the Configuration Device 105 includes a Configuration Application 230. Although illustrated as software residing in Memory 215, in embodiments, the Configuration Application 230 can be implemented using hardware, software, or a combination of hardware and software. In the illustrated embodiment, the Configuration Application 230 includes an Image Retriever 232, a Context Analyzer 234, a Popularity Component 236, a Segmentation Component 238, a Configuration Generator 240, and a Composition Generator 242. Although depicted as discrete components for illustration, in embodiments, the operations and functionality of the Image Retriever 232, Context Analyzer 234, Popularity Component 236, Segmentation Component 238, Configuration Generator 240, and Composition Generator 242 may be combined or divided across any number of components and devices.

In the illustrated embodiment, the Image Retriever 232 retrieves image from one or more Image Sources 115, to be ingested into the system. In one embodiment, the Image Retriever 232 similarly retrieves data defining the context and configuration of each image. In one embodiment, this information is stored as metadata associated with each image. Further, in an embodiment, the Image Retriever 232 collects popularity data (e.g., the number of likes, shares, and the like) for each image, to be used to generate a popularity score for the image. In some embodiments, the Image Retriever 232 periodically requests images and/or updated popularity metrics from one or more Image Sources 115. In another embodiment, the Image Sources 115 periodically push this data to the Image Retriever 232, without request. In one embodiment, each time the user uploads a new image, the Image Source 115 transmits the relevant data to the Image Retriever 232.

In an embodiment, the Context Analyzer 234 is used to generate a numerical vector representation for the context of each image. In an embodiment, this Context 244 is stored in the corresponding Image Record 243. In one embodiment, generating the vector includes assigning a numeric value to each element of the context associated with the image. For example, the lighting conditions can be represented as a lux or lumen value, the time can be represented as a value indicating the time of day (e.g., between 0 and 23.99), the location can be represented as geographic coordinates, the time of year can be encoded as a month and date value, and the like. In some embodiments, the weather data is similarly encoded using a predefined mapping from weather conditions to a numeric value. In an embodiment, the Context Analyzer 234 determines the current weather by looking up the received location using a weather service. In some embodiments, the Context Analyzer 234 can infer the weather by using image processing on one or more images recently captured by the Camera Device 110.

In one embodiment, the Context Analyzer 234 is further used to compute similarity measures and/or difference measures between images. In an embodiment, given an index context (e.g., the current context of a Camera Device 110), the Context Analyzer 234 can identify similar contexts by computing a Euclidean distance between the corresponding vectors. In some embodiments, as discussed above, the Context Analyzer 234 only considers images posted by the user that is associated with the Camera Device 110. In one embodiment, the Context Analyzer 234 considers images posted by the user, as well as images posted by users that are associated with the index user (e.g., friends or acquaintances of the user).

In the illustrated embodiment, the Popularity Component 236 analyzes the collected data to generate a Popularity Score 246 for each image. In one embodiment, this includes determining the number of likes/favorites (where more likes correspond to a higher score) associated with the image, the number of times the image has been shared (with a similar positive correlation), and the like. In some embodiments, the Popularity Component 236 further performs sentiment analysis on the comments associated with each image, to generate the popularity score. In an embodiment, this Popularity Score 246 is then stored in the corresponding Image Record 243, in order to be used for further processing. In one embodiment, Image Records 243 with Popularity Scores 246 below a predefined threshold are removed from the Storage 220. This may be, for example, because they are a bad example, and/or in order to save storage space. In an alternative embodiment, the Image Records 243 are maintained, and used as negative examples.

In an embodiment, the Segmentation Component 238 performs semantic segmentation using one or more machine learning models, such as a convolutional neural network, to identify elements in each image. For example, in an embodiment, the model(s) are trained to identify elements in images, such as people, vehicles, scenery, buildings, and the like. In an embodiment, the relative locations of these elements, with respect to each other and with respect to the frame of the image itself, are stored as Element Segmentation 247 information in the Image Record 243. In this way, the Configuration Application 230 can understand how elements are arranged in each image (e.g., whether the people are close to the camera or further away, where they are in relation to the edge of the frame and to other elements in the image, and the like).

In the illustrated embodiment, the Configuration Generator 240 is used to generate customized configurations for specified contexts. In an embodiment, when a user or Camera Device 110 provides a context, the Configuration Generator 240 identifies Image Records 243 with similar Contexts 244 (e.g., with a similarity measure exceeding a predefined threshold), in order to generate a configuration for the Camera Device 110. In some embodiments, the Configuration Generator 240 only utilizes Image Records 243 associated with the Camera Device 110 and/or user, as discussed above. Further, in one embodiment, the Configuration Generator 240 only utilizes Image Records 243 with a Popularity Score 246 exceeding a predefined threshold. In another embodiment, the Configuration Generator 240 uses less popular images as well, but associates them with lower weight.

In an embodiment, based on the Configuration 245 associated with each identified Image Record 243, the Configuration Generator 240 generates a dynamic and optimized configuration for the Camera Device 110. That is, in one embodiment, the Configuration Generator 240 generates a configuration that is similar to configurations used to capture prior images that are currently popular. In this way, the quality and popularity of the currently captured image(s) can be improved. In one embodiment, the Configuration Generator 240 pushes these configuration parameters to the Camera Device 110, which automatically implements them. In another embodiment, the Camera Device 110 prompts the user to approve the suggested configuration.

In one embodiment, similarly to the Configuration Generator 240, the Composition Generator 242 generates suggested compositions, based on the identified popular images with similar contexts. That is, in one embodiment, the Composition Generator 242 generates a proposed arrangement of elements that is more similar to previously-popular arrangements (such as placing the subject off-center of the frame, in the particular context). In embodiments, this composition is provided to the user as a suggestion, such that the user can adjust the position and/or angle of the camera, if desired. Similarly, if the user so desires, the elements themselves can be rearranged (such as by asking people to move to the side, and the like).

In the illustrated embodiment, the Camera Device 110 includes a Processor 250, a Memory 255, Storage 260, and a Network Interface 265. In the illustrated embodiment, Processor 250 retrieves and executes programming instructions stored in Memory 255 as well as stores and retrieves application data residing in Storage 260. Processor 250 is representative of a single CPU, multiple CPUs, a single CPU having multiple processing cores, and the like. Memory 255 is generally included to be representative of a random access memory. Storage 260 may be a disk drive or flash-based storage device, and may include fixed and/or removable storage devices, such as fixed disk drives, removable memory cards, or optical storage, network attached storage (NAS), or storage area network (SAN). Via the Network Interface 265, the Camera Device 110 can be communicatively coupled with one or more other devices including user devices, Configuration Device 105, and the like.

As illustrated, the Camera Device 110 further includes a set of Sensor(s) 280, a Display 282, and an Imaging Component 284. In embodiments, the Imaging Component 284 can generally be any component used to capture images, and may be, for example, a charge-coupled device (CCD) sensor, a complementary metal-oxide-semiconductor (CMOS) sensor, film, and the like. In an embodiment, the Display 282 is used to allow the user to view a preview of the frame visible to the Imaging Component 284, and/or to review captured images. In various embodiments, the Sensors 280 can include any sensor device, such as a compass or magnetometer, a geographic positioning system (GPS) sensor, a light sensor, and the like. In some embodiments, the Sensors 280 are used to capture some or all of the context.

As illustrated, the Storage 260 of the Camera Device 110 includes a Configuration 278. In an embodiment, the Configuration 278 includes parameters for each relevant setting available on the Camera Device 110, such as the ISO settings, aperture settings, shutter speed settings, and the like. In the illustrated embodiment, the Memory 255 includes an Imaging Application 270. Although illustrated as software residing in Memory 255, in embodiments, the functionality of the Imaging Application 270 can be implemented using software, hardware, or a combination of hardware and software. As illustrated, the Imaging Application 270 includes a Context Component 272, a Configuration Component 274, and a Composition Component 276. Although depicted as discrete components for illustration, in embodiments, the functionality and operations of the Context Component 272, Configuration Component 274, and Composition Component 276 may be combined or divided across any number of components.

In an embodiment, the Context Component 272 determines some or all of the current context of the Camera Device 110, and transmits it to the Configuration Device 105. For example, using a GPS sensor and magnetometer, the Context Component 272 can determine the current location and direction of the Camera Device 110. Similarly, using a light sensor, the Context Component 272 determines the current lighting environment. In some embodiments, the Context Component 272 further determines the user of the Camera Device 110, and provides this identity as further context. In some embodiments, the Context Component 272 looks up local weather conditions, and includes this in the context. In another embodiment, the Configuration Device 105 determines the current weather. In one embodiment, the Context Component 272 periodically transmits the current context to the Configuration Device 105 (e.g., every ten minutes). In another embodiment, the Context Component 272 transmits this context when the Camera Device 110 is powered on (or when a camera or imaging application is started or opened). In some embodiments, the Context Component 272 provides the context upon request or instruction from the user, or from the Configuration Device 105.

In the illustrated embodiment, the Configuration Component 274 can be used by the user to manually adjust the Configuration 278 of the Camera Device 110. In one embodiment, the Configuration Component 274 also receives generated configuration parameters from the Configuration Device 105, and modifies the Configuration 278 as needed. In embodiments, this modification may be performed automatically (e.g., without user input), or upon approval or confirmation from the user. In some embodiments, the user can select whether they would like to manually review and approve each configuration change, or whether it can be implemented automatically. In this way, the Camera Device 110 is repeatedly updated with optimized configurations that are customized for the particular current context.

In an embodiment, the Composition Component 276 receives suggested compositions from the Configuration Device 105, and provides them to the user. For example, in embodiments, the Composition Component 276 may output a representative image that includes the suggested composition or arrangement of elements. In one embodiment, the Composition Component 276 uses augmented reality to overlay indications on the Display 282, showing the user where each element should be in order to improve the popularity and quality of the captured image(s). Although not illustrated, in some embodiments, the user can provide feedback for the suggested configurations and/or compositions. In an embodiment, the Configuration Application 230 uses this feedback to modify its rules and/or weightings, or to refine its machine learning models. In this way, the Configuration Application 230 can generate better configurations and/or compositions for the user.

Figure 3:
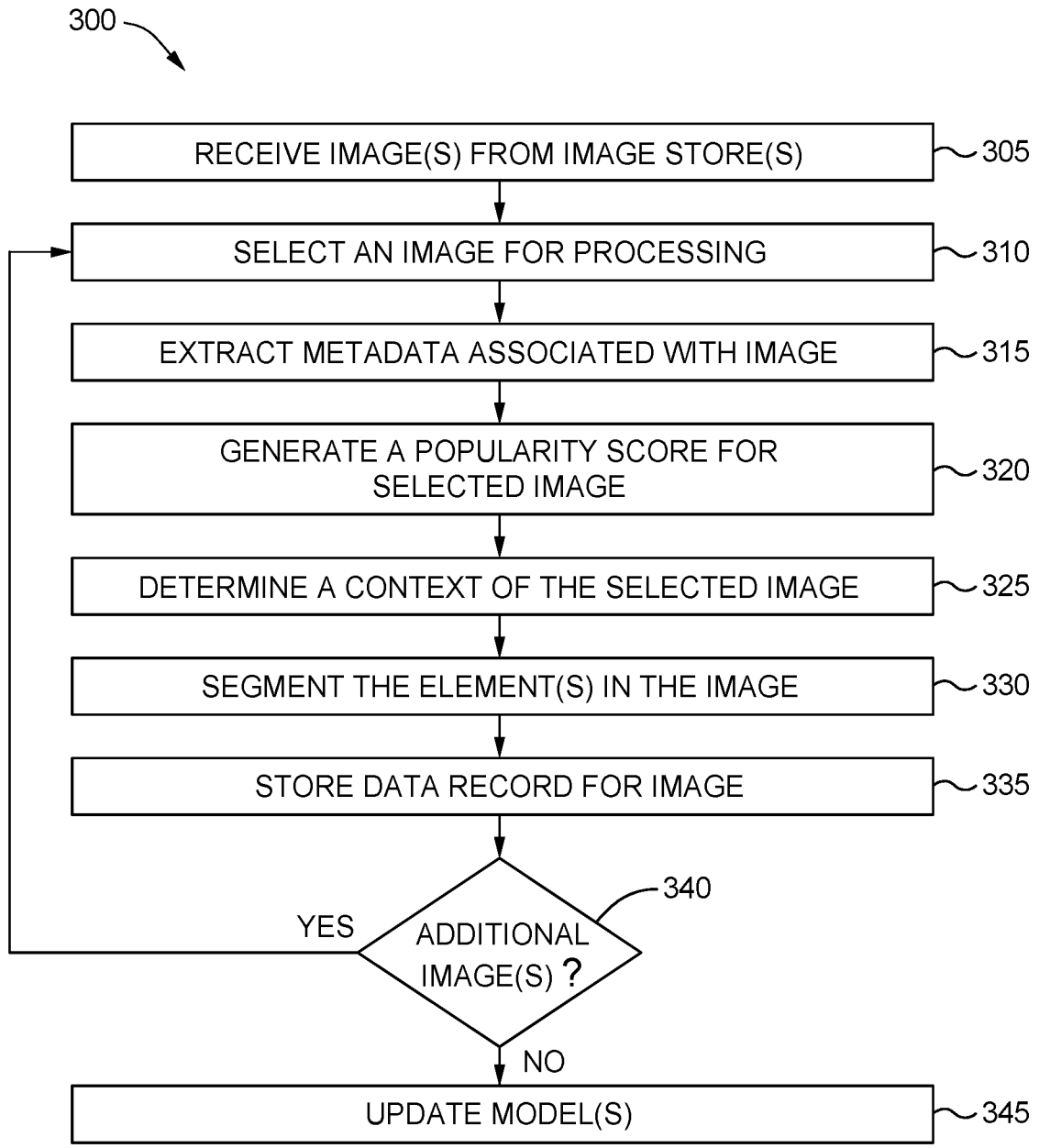
FIG. 3 is a flow diagram illustrating a method for ingesting prior images to aid generating of improved configurations and compositions, according to one embodiment disclosed herein.

FIG. 3 is a flow diagram illustrating a method 300 for ingesting prior images to aid generating of improved configurations and compositions, according to one embodiment disclosed herein. The method 300 begins at block 305, where a Configuration Application 230 receives one or more images from one or more image stores (e.g., social media networks). At block 310, the Configuration Application 230 selects a first image for processing/ingestion. The method 300 then proceeds to block 315, where the Configuration Application 230 extracts metadata associated with the image. As discussed above, in some embodiments, each image includes metadata describing the context of the camera and environment when the image was captured, the configuration parameters used by the camera at the time, and the like. In some embodiments, the metadata further describes the popularity of the image (such as a number of likes). The method 300 then proceeds to block 320.

At block 320, the Configuration Application 230 generates a popularity score for the selected image, based on the metrics gathered from the image source. As discussed above, in embodiments, this can include the number of likes, shares, favorites, and similar metrics. In some embodiments, the Configuration Application 230 further performs sentiment analysis on the comments associated with the image, in order to generate the popularity score. The method 300 continues to block 325, where the Configuration Application 230 determines the context of the image, based on the metadata. In one embodiment, this includes looking up the weather occurring at the time and location indicated by the metadata. In some embodiments, determining the context includes generating a numerical vector representation of the context.

The method 300 then proceeds to block 330, where the Configuration Application 230 performs semantic segmentation on the image to identify and label the elements visible in the frame, such as animals, people, and the like. Finally, at block 335, the Configuration Application 230 stores the data in an image record, for later use. At block 340, the Configuration Application 230 determines whether there is at least one additional received image for processing. If so, the method 300 returns to block 310. Otherwise, the method 300 proceeds to block 345, where the Configuration Application 230 updates any models or algorithms used to generate configurations and compositions, based on the newly created (and/or newly updated) image records.

Figure 4:
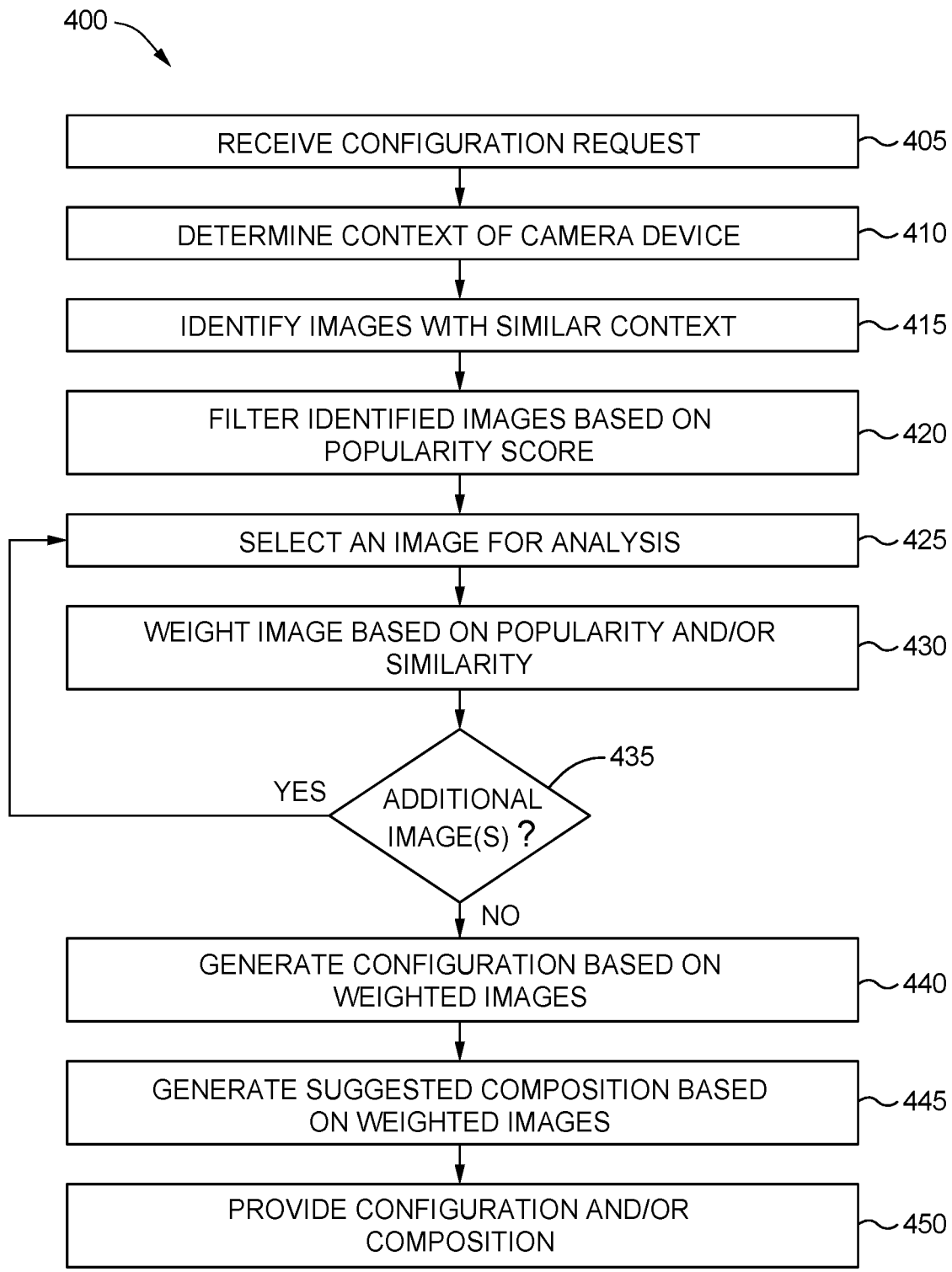
FIG. 4 is a flow diagram illustrating a method for generating suggested compositions and configurations to improve captured images, according to one embodiment disclosed herein.

FIG. 4 is a flow diagram illustrating a method 400 for generating suggested compositions and configurations to improve captured images, according to one embodiment disclosed herein. The method 400 begins at block 405, where a Configuration Application 230 receives a configuration request from a camera device. In some embodiments, this request includes the current context of the device. In another embodiment, the Configuration Application 230 transmits a request for the current context, and awaits a response. Once the context is received, the method 400 proceeds to block 410, where the Configuration Application 230 determines the current context.

At block 415, the Configuration Application 230 uses this context to identify prior-ingested images with a similar context (e.g., taken at a similar location, at a similar time of day and/or time of year, and the like). In one embodiment, the Configuration Application 230 restricts this search to images that are associated with the index user (e.g., posted by the user, or posted by the user's immediate friends or acquaintances). The method 400 then continues to block 420, where the Configuration Application 230 filters the identified similar images based on their corresponding popularity scores. That is, in the illustrated embodiment, the Configuration Application 230 only utilizes images with a popularity score exceeding a predefined threshold. In other embodiments, the Configuration Application 230 utilizes all similar images, and reduces the weight of each image, in proportion to the lower popularity score.

The method 400 then proceeds to block 425, where the Configuration Application 230 selects one of the identified similar and/or filtered images for further processing. At block 430, the Configuration Application 230 generates a weight for the image, based on its popularity score and/or similarity measure. For example, in an embodiment, the popularity score and similarity measure are both positively correlated with the generated weight, such that the images that are very similar and very popular will have a higher weight, as compared to images that are less similar, and/or less popular. The Configuration Application 230 then associates this weight with the image, such that the contribution of each individual image to the final suggested settings is based on how similar/popular the image is.

At block 435, the Configuration Application 230 determines whether there is at least one additional similar image with sufficient popularity to survive the filtration. If so, the method 400 returns to block 425. Otherwise, the method 400 proceeds to block 440, where the Configuration Application 230 generates a configuration for the requesting camera device, based on the weighted images. That is, the Configuration Application 230 identifies the prior configuration associated with each image, weights each configuration based on the corresponding image weights, and aggregates these configurations to generate an overall suggested configuration for the current context of the current camera device.

The method 400 then proceeds to block 445, where the Configuration Application 230 similarly generates a suggested composition/arrangement of elements for the device, based on the weighted images. That is, the Configuration Application 230 determines the arrangements used in each prior image, weights each potential arrangement based on the corresponding image weight, and generates a proposed arrangement of elements for the camera device. The method 400 then terminates at block 450, where the Configuration Application 230 provides these generated configurations and/or compositions to the requesting camera device.

Figure 5:
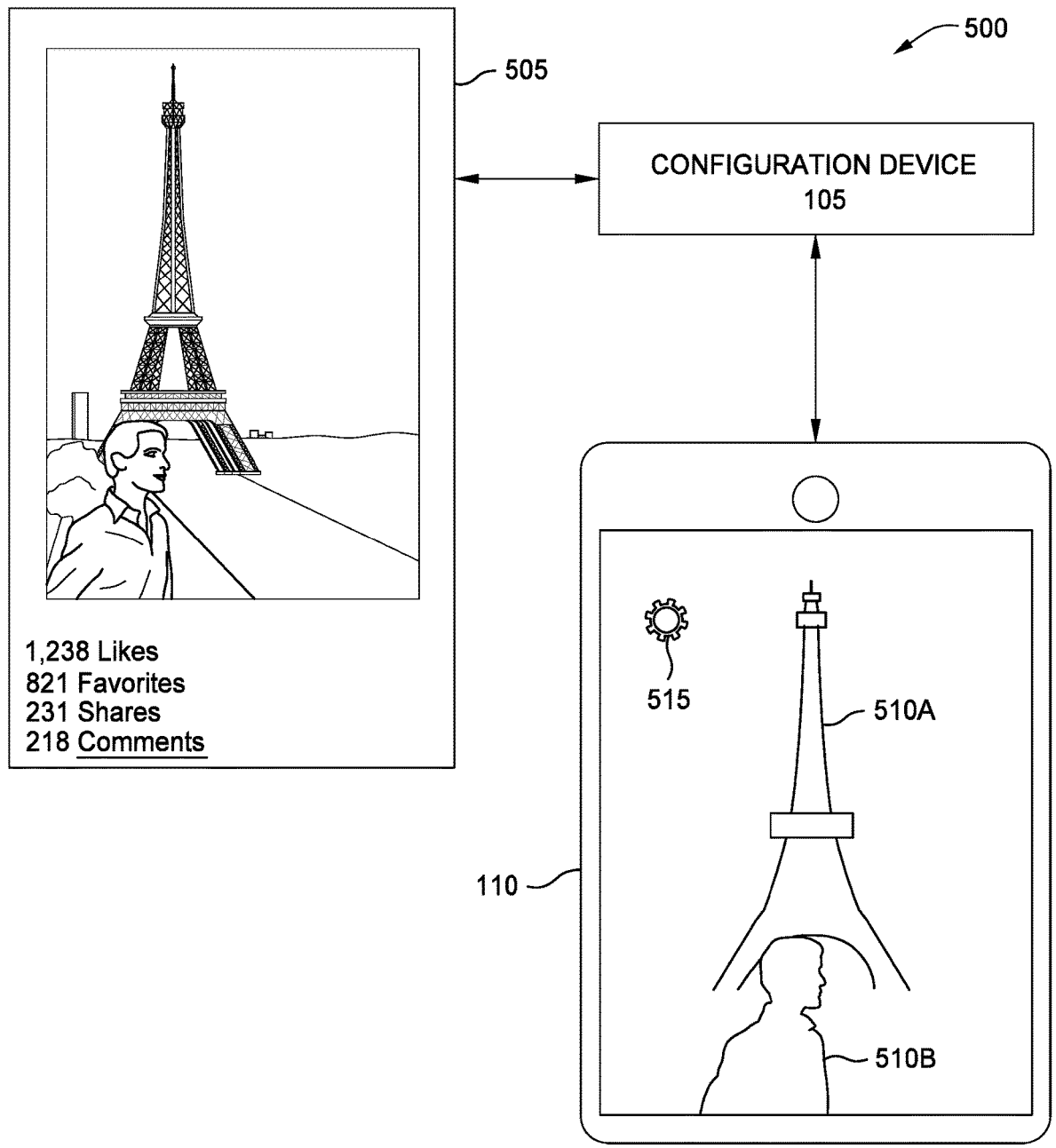
FIG. 5 illustrates a workflow for generating and providing compositions and configurations, according to one embodiment disclosed herein.

FIG. 5 illustrates a workflow 500 for generating and providing compositions and configurations, according to one embodiment disclosed herein. In the illustrated workflow 500, the Configuration Device 105 has analyzed at least one Image 505 in order to generate a composition and configuration for the Camera Device 110. In one embodiment, the Configuration Device 105 selected the Image 505 based on determining that the Camera Device 110 is currently associated with a context that is similar to the context associated with the Image 505. For example, the Camera Device 110 may currently be located near to the same geographic location as where the Image 505 was captured (e.g., near the Eiffel Tower) at a similar time of day, and during similar weather conditions. Although a single Image 505 is illustrated, in embodiments, the Configuration Device 105 can analyze any number of images.

In the illustrated embodiment, the Image 505 has also been quite popular, as indicated by the number of likes, favorites, shares, and comments. In an embodiment, based on determining that the Image 505 is popular and is associated with a similar context, the Configuration Device 105 has determined the configuration used to capture the Image 505, and has provided this configuration (or a similar configuration) to the Camera Device 110, as illustrated by the Gear Icon 515. Further, in the illustrated embodiment, the Configuration Device 105 has identified the major elements of the Image 505 (e.g., the Eiffel Tower and the people), and has generated a suggested composition to match the arrangement of these elements. In some embodiments, this includes overlaying an outline or other indication of the elements on the display of the Camera Device 110 (e.g., over the image of the physical world that is currently visible to the Camera Device 110). As illustrated, this indication includes an Outline 510A to indicate the suggested position of the Eiffel Tower in the frame, as well as an Outline 510B indicating the suggested position of the people in the frame. In such an embodiment, the Configuration Device 105 utilizes augment reality to guide the user to move the identified elements, the position or orientation of the Camera Device 110, or both, in order to achieve a similar composition to the one reflected in the popular Image(s) 505.

Figure 6:
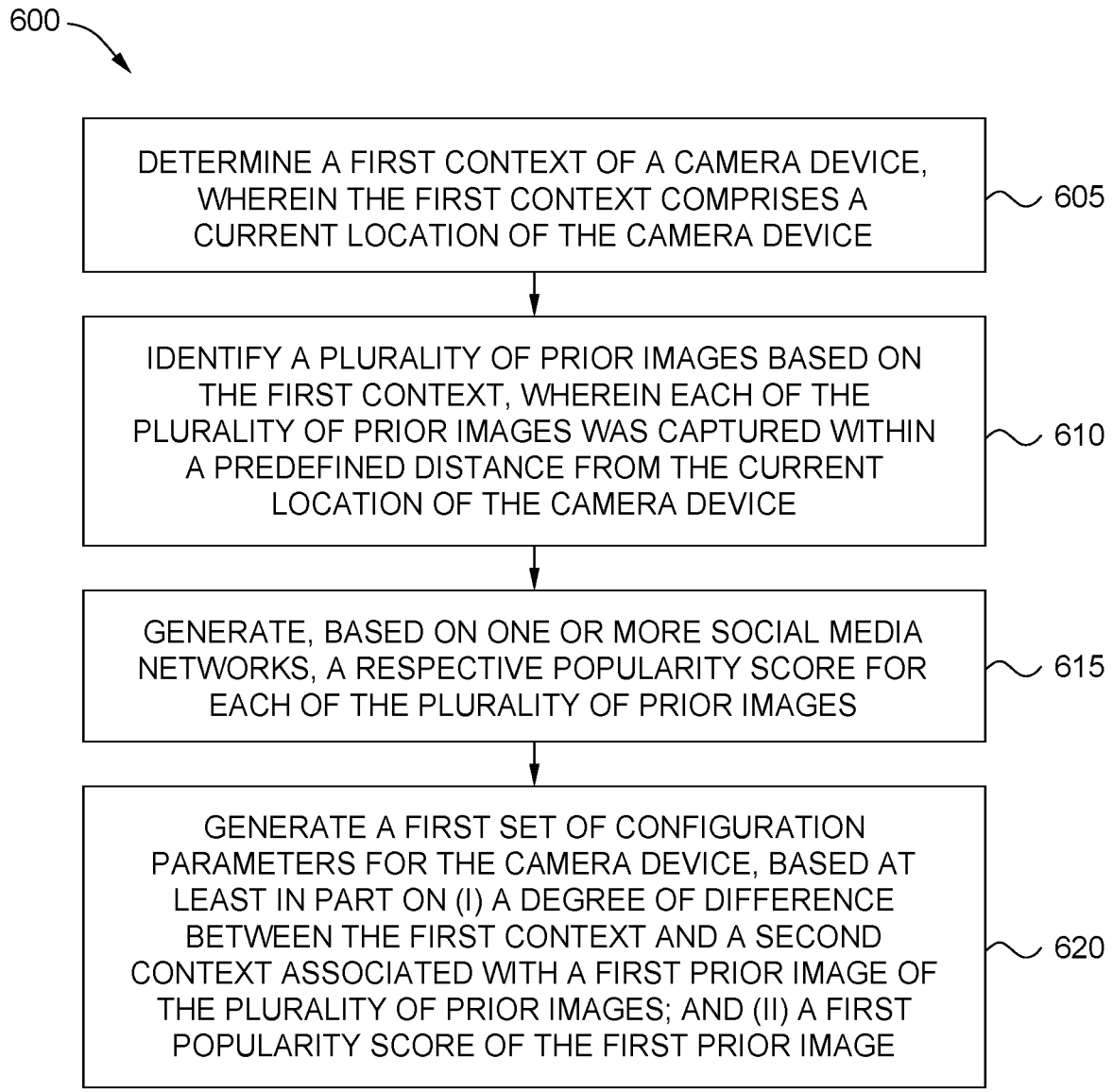
FIG. 6 is a flow diagram illustrating a method for generating improved configuration parameters for image capture, according to one embodiment disclosed herein.

FIG. 6 is a flow diagram illustrating a method 600 for generating improved configuration parameters for image capture, according to one embodiment disclosed herein. The method 600 begins at block 605, where a Configuration Application 230 determines a first context of a camera device, wherein the first context comprises a current location of the camera device. At block 610, the Configuration Application 230 identifies a plurality of prior images based on the first context, wherein each of the plurality of prior images was captured within a predefined distance from the current location of the camera device. The method 600 then proceeds to block 615, where the Configuration Application 230 generates, based on one or more social media networks, a respective popularity score for each of the plurality of prior images. Finally, at block 620, the Configuration Application 230 generates a first set of configuration parameters for the camera device, based at least in part on: (i) a degree of difference between the first context and a second context associated with a first prior image of the plurality of prior images; and (ii) a first popularity score of the first prior image.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Configuration Application 230) or related data available in the cloud. For example, the Configuration Application 230 could execute on a computing system in the cloud and generate suggested configurations and compositions. In such a case, the Configuration Application 230 could ingest prior images from social media, and store image records at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   determining a first context of a camera device, wherein the first context comprises a current location of the camera device;
   identifying a plurality of prior images based on the first context, wherein each of the plurality of prior images was captured within a predefined distance from the current location of the camera device;
   generating, based on one or more social media networks, a respective popularity score for each of the plurality of prior images; and
   generating a first set of configuration parameters for the camera device, based at least in part on (i) differences between the first context and contexts associated with one or more prior images of the plurality of prior images; and (ii) popularity scores of one or more prior images, comprising:
   determining a second set of configuration parameters used when capturing a first prior image of the plurality of prior images;
   determining a degree of difference between the first context and the second context; and
   determining a first weight for the second set of configuration parameters based on the first degree of difference; and aggregating the second set of configuration parameters with at least one additional set of configuration parameters based at least in part on the weight for the second set of configuration parameters.

2. The method of claim 1, wherein the first context further comprises:
   (i) a current time at the current location of the camera device;
   (ii) lighting conditions at the current location of the camera device; and
   (iii) weather conditions at the current location of the camera device.

3. The method of claim 1, wherein generating the respective popularity score for each of the plurality of prior images comprises, for each respective prior image of the plurality of prior images:
   determining a number of likes associated with the respective prior image;
   determining a number of shares associated with the respective prior image;
   retrieving a plurality of comments associated with the respective prior image;
   generating a respective sentiment score for each of the plurality of comments; and
   generating the respective popularity score based on the determined number of likes, number of shares, and the respective sentiment scores for each the plurality of comments.

4. The method of claim 1, wherein generating the first set of configuration parameters for the camera device further comprises:
   identifying a subset of the plurality of prior images having a respective popularity score exceeding a predefined threshold;
   for each respective prior image of the subset of the plurality of prior images:
      determining a respective set of configuration parameters used when capturing the respective prior image;
      determining a respective degree of difference between the respective context of the respective prior image and the first context, based on a Euclidean distance between the respective context and the first context; and
      determining a respective weight for the respective set of configuration parameters, based on the respective degree of difference; and
   aggregating the respective sets of configuration parameters based on their respective weights.

5. The method of claim 1, wherein the first set of configuration parameters include at least one of:
   (i) an aperture setting for the camera device;
   (ii) an International Organization of Standardization (ISO) setting for the camera device;
   (iii) a shutter speed for the camera device;
   (iv) a white balance setting for the camera device; or
   (v) a flash setting for the camera device.

6. The method of claim 1, the method further comprising:
   for each respective prior image of the plurality of prior images, identifying one or more elements in the respective prior image by using one or more machine learning models to perform semantic segmentation, wherein the one or more elements include at least one of (i) scenery or (ii) a person;
   generating a suggested arrangement of elements by aggregating a location of the one or more elements identified in each prior image of the plurality of prior images based on the respective popularity score of each respective prior image; and
   providing the suggested arrangement of elements to a user of the camera device.

7. The method of claim 6, wherein the suggested arrangement of elements includes at least one of:
   (i) a suggestion to move a person in a frame of the camera device to another physical position; or
   (ii) a suggestion to modify an angle of the camera device in order to change a location of one or more elements in the frame of the camera device.

8. The method of claim 1, the method further comprising:
   receiving feedback about the first set of configuration parameters; and
   modifying one or more models used to generate configuration parameters, based on the feedback.

9. A non-transitory computer-readable storage medium having computer-readable program code embodied therewith, the computer-readable program code executable by one or more computer processors to perform an operation comprising:
   determining a first context of a camera device, wherein the first context comprises a current location of the camera device;
   identifying a plurality of prior images based on the first context, wherein each of the plurality of prior images was captured within a predefined distance from the current location of the camera device;
   generating, based on one or more social media networks, a respective popularity score for each of the plurality of prior images; and
   generating a first set of configuration parameters for the camera device, based at least in part on (i) a degree of difference between the first context and contexts associated with one or more prior images of the plurality of prior images; and (ii) popularity scores of one or more prior images, comprising:
      determining a second set of configuration parameters used when capturing a first prior image of the plurality of prior images;
      determining a degree of difference between the first context and the second context; and
      determining a weight for the second set of configuration parameters based on the first degree of difference; and
      aggregating the second set of configuration parameters with at least one additional set of configuration parameters based at least in part on the weight for the second set of configuration parameters.

10. The computer-readable storage medium of claim 9, wherein the first context further comprises:
    (i) a current time at the current location of the camera device;
    (ii) lighting conditions at the current location of the camera device; and
    (iii) weather conditions at the current location of the camera device.

11. The computer-readable storage medium of claim 9, wherein generating the first set of configuration parameters for the camera device further comprises:
    identifying a subset of the plurality of prior images having a respective popularity score exceeding a predefined threshold;

for each respective prior image of the subset of the plurality of prior images:
    determining a respective set of configuration parameters used when capturing the respective prior image;
    determining a respective degree of difference between the respective context of the respective prior image and the first context, based on a Euclidean distance between the respective context and the first context; and
    determining a respective weight for the respective set of configuration parameters, based on the respective degree of difference; and
aggregating the respective sets of configuration parameters based on their respective weights.

12. The computer-readable storage medium of claim 9, wherein generating the respective popularity score for each of the plurality of prior images comprises, for each respective prior image of the plurality of prior images:
    determining a number of likes associated with the respective prior image;
    determining a number of shares associated with the respective prior image;
    retrieving a plurality of comments associated with the respective prior image;
    generating a respective sentiment score for each of the plurality of comments; and
    generating the respective popularity score based on the determined number of likes, number of shares, and the respective sentiment scores for each the plurality of comments.

13. The computer-readable storage medium of claim 9, the operation further comprising:
    for each respective prior image of the plurality of prior images, identifying one or more elements in the respective prior image by using one or more machine learning models to perform semantic segmentation, wherein the one or more elements include at least one of (i) scenery or (ii) a person;
    generating a suggested arrangement of elements by aggregating a location of the one or more elements identified in each prior image of the plurality of prior images based on the respective popularity score of each respective prior image; and
    providing the suggested arrangement of elements to a user of the camera device, wherein the suggested arrangement of elements includes at least one of:
        (i) a suggestion to move a person in a frame of the camera device to another physical position; or
        (ii) a suggestion to modify an angle of the camera device in order to change a location of one or more elements in the frame of the camera device.

14. The computer-readable storage medium of claim 9, the operation further comprising:
    receiving feedback about the first set of configuration parameters; and
    modifying one or more models used to generate configuration parameters, based on the feedback.

15. A system comprising:
    one or more computer processors; and
    a memory containing a program which when executed by the one or more computer processors performs an operation, the operation comprising:
        determining a first context of a camera device, wherein the first context comprises a current location of the camera device;
        identifying a plurality of prior images based on the first context, wherein each of the plurality of prior images was captured within a predefined distance from the current location of the camera device;
        generating, based on one or more social media networks, a respective popularity score for each of the plurality of prior images; and
        generating a first set of configuration parameters for the camera device, based at least in part on (i) a degree of difference between the first context and contexts associated with one or more prior images of the plurality of prior images; and (ii) popularity scores of one or more prior images, comprising:
            determining a second set of configuration parameters used when capturing a first prior image of the plurality of prior images;
            determining a degree of difference between the first context and the second context; and
            determining a weight for the second set of configuration parameters based on the first degree of difference; and
            aggregating the second set of configuration parameters with at least one additional set of configuration parameters based at least in part on the weight for the second set of configuration parameters.

16. The system of claim 15, wherein the first context further comprises:
    (i) a current time at the current location of the camera device;
    (ii) lighting conditions at the current location of the camera device; and
    (iii) weather conditions at the current location of the camera device.

17. The system of claim 15, wherein generating the first set of configuration parameters for the camera device further comprises:
    identifying a subset of the plurality of prior images having a respective popularity score exceeding a predefined threshold;
    for each respective prior image of the subset of the plurality of prior images:
        determining a respective set of configuration parameters used when capturing the respective prior image;
        determining a respective degree of difference between the respective context of the respective prior image and the first context, based on a Euclidean distance between the respective context and the first context; and
        determining a respective weight for the respective set of configuration parameters, based on the respective degree of difference; and
    aggregating the respective sets of configuration parameters based on their respective weights.

18. The system of claim 15, wherein generating the respective popularity score for each of the plurality of prior images comprises, for each respective prior image of the plurality of prior images:
    determining a number of likes associated with the respective prior image;
    determining a number of shares associated with the respective prior image;
    retrieving a plurality of comments associated with the respective prior image;
    generating a respective sentiment score for each of the plurality of comments; and
    generating the respective popularity score based on the determined number of likes, number of shares, and the respective sentiment scores for each the plurality of comments.

19. The system of claim 15, the operation further comprising:
- for each respective prior image of the plurality of prior images, identifying one or more elements in the respective prior image by using one or more machine learning models to perform semantic segmentation, wherein the one or more elements include at least one of (i) scenery or (ii) a person;
- generating a suggested arrangement of elements by aggregating a location of the one or more elements identified in each prior image of the plurality of prior images based on the respective popularity score of each respective prior image; and
- providing the suggested arrangement of elements to a user of the camera device, wherein the suggested arrangement of elements includes at least one of:
  - (i) a suggestion to move a person in a frame of the camera device to another physical position; or
  - (ii) a suggestion to modify an angle of the camera device in order to change a location of one or more elements in the frame of the camera device.

20. The system of claim 15, the operation further comprising:
- receiving feedback about the first set of configuration parameters; and
- modifying one or more models used to generate configuration parameters, based on the feedback.

* * * * *